United States Patent
Carl

(10) Patent No.: US 6,707,221 B2
(45) Date of Patent: Mar. 16, 2004

(54) AXIAL FLUX MACHINE, STATOR AND FABRICATION METHOD

(75) Inventor: Ralph James Carl, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/063,280

(22) Filed: Apr. 8, 2002

(65) Prior Publication Data

US 2003/0189386 A1 Oct. 9, 2003

(51) Int. Cl.⁷ .................................................. H02K 1/12
(52) U.S. Cl. ...................... 310/254; 310/258; 310/259; 310/218
(58) Field of Search ................................ 310/254, 258, 310/259, 261, 208, 214, 216, 217, 218

(56) References Cited

U.S. PATENT DOCUMENTS

| | | | |
|---|---|---|---|
| 1,566,693 A | | 12/1925 | Pletscher |
| 2,872,604 A | | 2/1959 | Speth |
| 2,873,395 A | | 2/1959 | Kober |
| 3,428,840 A | | 2/1969 | Kober |
| 4,187,441 A | | 2/1980 | Oney |
| 4,429,263 A | | 1/1984 | Miller |
| 4,605,874 A | * | 8/1986 | Whiteley ..................... 310/268 |
| 4,947,065 A | | 8/1990 | Ward et al. |
| 5,168,187 A | * | 12/1992 | Baer et al. ................ 310/49 R |
| 5,177,054 A | * | 1/1993 | Lloyd et al. ................ 505/166 |
| 5,177,392 A | | 1/1993 | Scott |
| 5,742,450 A | * | 4/1998 | Moser ..................... 360/99.08 |
| 5,760,504 A | * | 6/1998 | Moser ....................... 310/67 R |
| 6,232,696 B1 | * | 5/2001 | Kim et al. ............. 310/156.37 |
| 6,278,212 B1 | * | 8/2001 | Kalsi .......................... 310/162 |
| 2002/0195896 A1 | * | 12/2002 | Sun ....................... 310/156.32 |

OTHER PUBLICATIONS

J. Hendershot, Jr., et al, "Design of Bruchless Permanent – Magnet Motors", 1994, pp. 2–10–2–12.

GB Kliman "Permanent Magnet AC Disc Motor Electric Vehicle Drive", SAE Technical Paper Series, International Congress & Exposition, Detroit, MI, Feb.–Mar. 1983, pp. 1–9.

U.S. patent application, Ser. No. 09/286966, Filed Apr. 6, 1999, Entitled "Axial Flux Machine and Method of Fabrication" by GB Kliman, et al.

* cited by examiner

*Primary Examiner*—Thanh Lam
(74) *Attorney, Agent, or Firm*—Ann M. Agosti; Patrick K. Patnode

(57) ABSTRACT

An axial flux machine comprises: a soft magnetic composite stator extension positioned in parallel with a rotor disk and having slots; soft magnetic composite pole pieces attached to the stator extension and facing a permanent magnet on the rotor disk, each comprising a protrusion situated within a respective one of the slots, each protrusion shaped so as to facilitate orientation of the respective pole piece with respect to the stator extension; electrical coils, each wrapped around a respective one of the pole pieces. In another embodiment the soft magnetic composite pole pieces each comprise a base portion around with the electrical coils are wound and a trapezoidal shield portion a plurality of heights with a first height in a first region being longer than a second height in a second region, the second region being closer to a pole-to-pole gap than the first region.

27 Claims, 7 Drawing Sheets

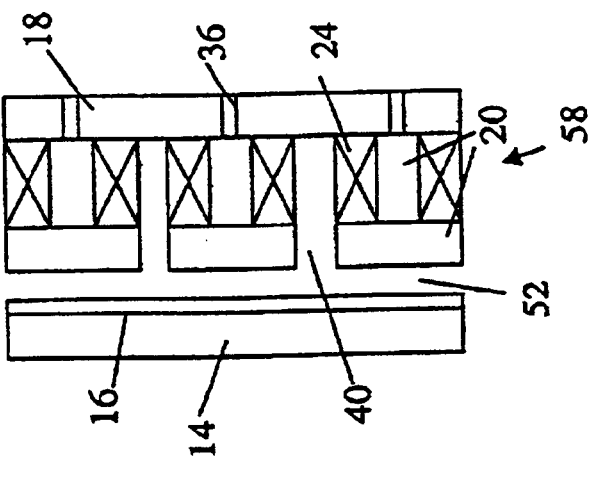
FIG. 2
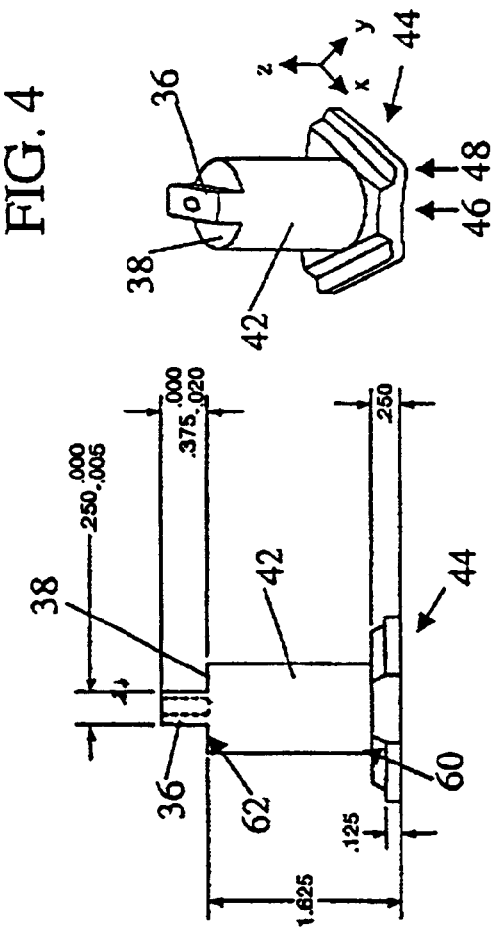
FIG. 3
FIG. 4

AXIAL FLUX MACHINE, STATOR AND FABRICATION METHOD

FEDERAL RESEARCH STATEMENT

This invention was made with United States Government support under contract number DEFC260NT40993 awarded by the United States Department of Energy. The United States Government has certain rights in the invention

BACKGROUND OF INVENTION

The present invention relates generally to axial flux machines.

Axial flux machines, sometimes referred to as disk, axial-gap, or pancake motors, are presently used in appliances that have low to modest power requirements such as video cassette recorders and blenders, for example.

There is a particular need for a simple fabrication process for providing an axial flux motor having increased power density and efficiency.

SUMMARY OF INVENTION

Briefly, in accordance with one embodiment of the present invention, an axial flux machine comprises: a rotatable shaft; a rotor disk coupled to the rotatable shaft; a permanent magnet supported by the rotor disk; a soft magnetic composite stator extension positioned in parallel with the rotor disk and having slots; soft magnetic composite pole pieces attached to the stator extension and facing the permanent magnet, each comprising a protrusion situated within a respective one of the slots, each protrusion shaped so as to facilitate orientation of the respective pole piece with respect to the stator extension; and electrical coils, each wrapped around a respective one of the pole pieces. In accordance with another embodiment of the present invention, an axial flux machine stator comprises: a soft magnetic composite stator extension having slots; soft magnetic composite pole pieces attached to the stator extension, each comprising a protrusion situated within a respective one of the slots, each protrusion shaped so as to facilitate orientation of the respective pole piece with respect to the stator extension; and electrical coils, each wrapped around a respective one of the pole pieces.

In accordance with another embodiment of the present invention, An axial flux machine comprises: a rotatable shaft; a rotor disk coupled to the rotatable shaft; a permanent magnet supported by the rotor disk; a soft magnetic composite stator extension positioned in parallel with the rotor disk; soft magnetic composite pole pieces attached to the stator extension and facing the permanent magnet, each comprising a base portion and a trapezoidal shield portion, the trapezoidal shield portion having a plurality of heights with a first height in a first region being longer than a second height in a second region, the second region being closer to a pole-to-pole gap than the first region; and electrical coils, each respective electrical coil wrapped around a respective base portion of a respective pole piece with a respective trapezoidal shield portion extending over at least part of the respective electrical coil.

In accordance with another embodiment of the present invention, an axial flux machine stator comprises a soft magnetic composite stator extension; soft magnetic composite pole pieces attached to the stator extension, each comprising a base portion and a trapezoidal shield portion, the trapezoidal shield portion having a plurality of heights with a first height in a first region being longer than a second height in a second region, the second region being closer to a pole-to-pole gap than the first region; and electrical coils, each respective electrical coil wrapped around a respective base portion of a respective pole piece with a respective trapezoidal shield portion extending parallel to the stator extension over at least part of the respective electrical coil.

In accordance with another embodiment of the present invention, an axial flux machine stator pole piece comprises: a soft magnetic composite base portion; a soft magnetic composite trapezoidal shield portion coupled to a first end of the base portion, the trapezoidal shield portion comprising a plurality of heights with a first height in a first region being longer than a second height in a second region, the second region being further from the base portion than the first region; and a protrusion coupled to a second end of the base portion and shaped so as to facilitate orientation of the respective pole piece.

In accordance with another embodiment of the present invention, a method of fabricating an axial flux machine stator comprises attaching soft magnetic composite pole pieces to a soft magnetic composite stator extension by situating protrusions of the pole pieces within respective slots of the stator extension, each protrusion shaped so as to facilitate orientation of the respective pole piece with respect to the stator extension.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein:

FIG. 2 is a sectional side view of a portion of the axial flux machine of FIG. 1.

FIG. 3 is a side view of a pole piece in accordance with another embodiment of the present invention.

FIG. 4 is a perspective view of the pole piece of FIG. 3.

DETAILED DESCRIPTION

In commonly assigned Kliman et al., U.S. application Ser. No. 09/286,966, filed Apr. 6, 1999, an axial flux machine is described as including a rotatable shaft, a rotor disk coupled to the rotatable shaft, a permanent magnet supported by the rotor disk, a stator extension positioned in parallel with the rotor disk, molded iron pole pieces attached to the stator extension and facing the permanent magnet, and electrical coils, each wrapped around a respective one of the molded iron pole pieces.

Figure 1:
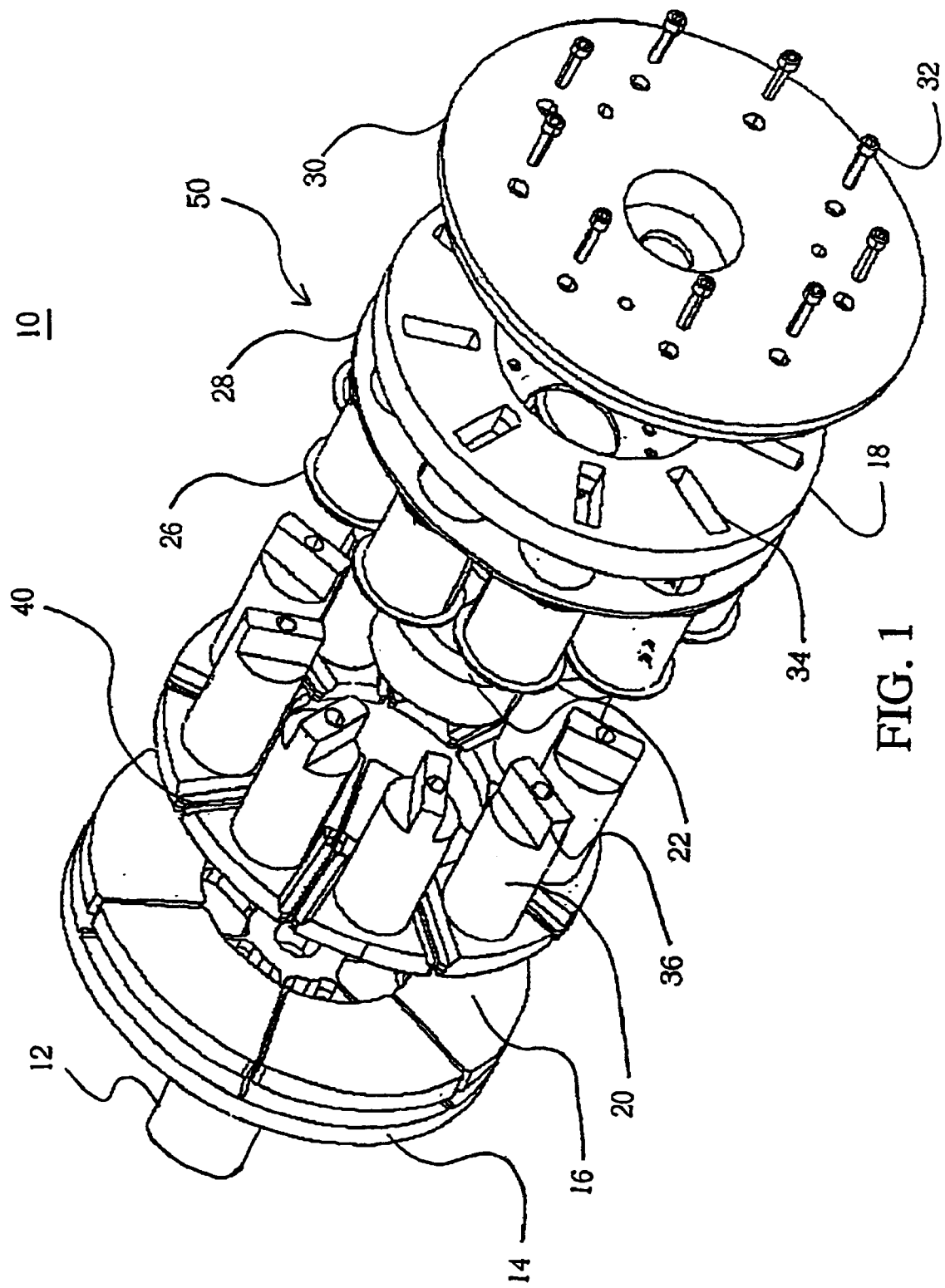
FIG. 1 is an expanded perspective view of an axial flux machine in accordance with one embodiment of the present invention.
Figure 5:
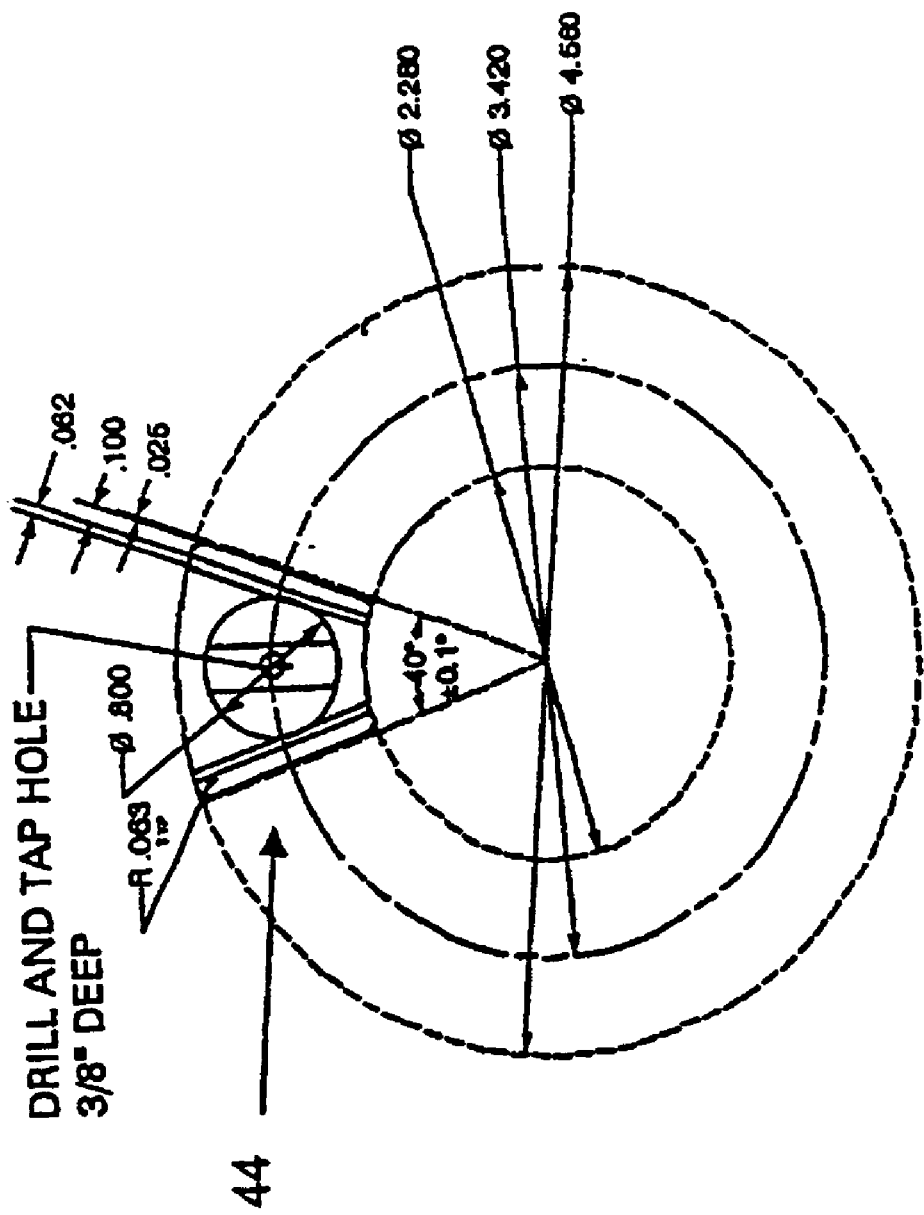
FIG. 5 is a top view of the pole piece of FIG. 3.
Figure 6:
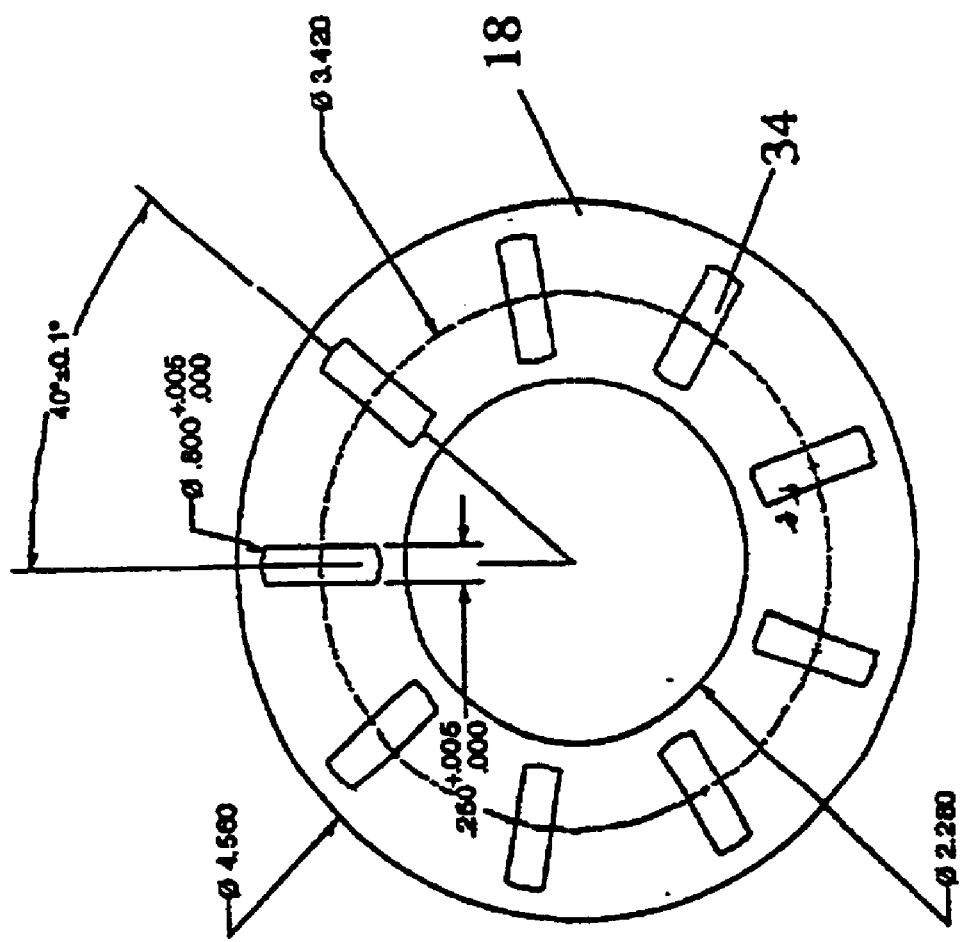
FIG. 6 is a top view of a stator extension in accordance with another embodiment of the present invention.
Figure 7:
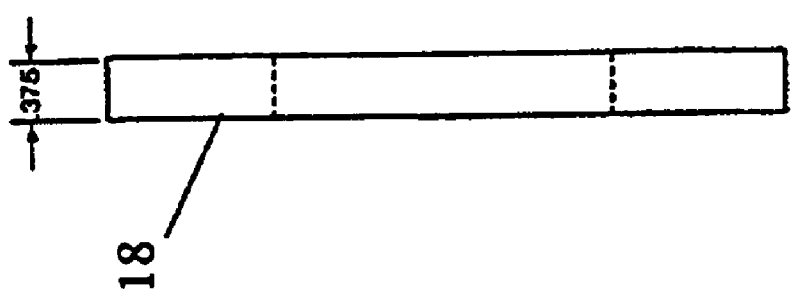
FIG. 7 is a side view of the stator extension of FIG. 6.

For optimal performance, the pole pieces are properly oriented in all three dimensions (x, y, x) with respect to the stator extension. To facilitate such orientation, in accordance with one embodiment of the present invention, as shown in FIG. 1, an axial flux machine 10 comprises: a rotatable shaft 12; a (meaning at least one) rotor disk 14 coupled to rotatable shaft 12; a (meaning at least one) permanent magnet 16 supported by rotor disk 14; a (meaning at least one) soft magnetic composite stator 58 extension 18 positioned in parallel with rotor disk 14 and having slots 34; soft magnetic composite pole pieces 20 attached to stator extension 18 and facing permanent magnet 16, each comprising a (meaning at least one) protrusion 36 situated within a respective one of slots 34, each protrusion 36 shaped so as to facilitate orientation of the respective pole piece with respect to stator extension 18; and electrical coils 24 (shown in FIG. 2), each wrapped around a respective one of the pole pieces. Each of the dimensions shown in FIGS. 3–7 is for purposes of example only. The present invention is not intended to be limited to any particular set of dimensions.

Rotatable shaft 12 typically comprises a steel shaft configured to be coupled to a shaft of another rotary device. Rotor disk 14 typically comprises a solid iron disk which serves as a magnetic flux path and provides mechanical support for permanent magnet 16. Permanent magnet 16 typically comprises either a plurality of separate, axially magnetized, thin trapezoids, or a continuous ring with a multi-pole pattern impressed thereon. Electrical coils 24 typically comprise copper wire.

Protrusions 36 are shaped so as to facilitate orientation of pole pieces 20 with respect to stator extension 18 (and thereby control air gap spacing and pole-to-pole spacing). In one embodiment, the geometries of slots 34 and protrusions 36 are keyed by coordinating the height of protrusion 36 with the depth of slot 34 (in the z plane for air gap spacing control), the outer perimeter of protrusion 36 with the inner perimeter of slot 34 (in the x-y plane for pole-to-pole spacing control), or combinations thereof. For example, in a more specific embodiment, slots 34 comprise quasi-rectangular slots and protrusions 36 comprise quasi-rectangular protrusions. Quasi-rectangular is intended to mean either exactly rectangular or two longer parallel sides accompanied by two shorter curved sides as shown, for example, in FIGS. 3–4 and 6.

Pole pieces 20 are coupled both magnetically and mechanically to stator extension 18. Typical materials for pole pieces 20 include soft magnetic composite materials, for example, and generally are of low electrical conductivity and have isotropic magnetic properties. Similar materials are typically used for stator extension 18. Slots 34 and protrusions 36 can typically be molded to a precision within about 75 micrometers, for example.

To minimize the reluctance path for magnetic flux, the contact between stator extension 18 and pole pieces 20 is as intimate as feasible. In one embodiment, protrusions 36 extend from ledges 38 of the pole pieces which are substantially parallel to the stator extension. Contact can additionally or alternatively be facilitated by use of an end plate 30 and fasteners 32 with fasteners 32 extending through end plate 30 and into respective ones of protrusions 36. In a more specific embodiment, fasteners 32 comprise screws. In alternative embodiments, protrusions 36 are press fitted into stator extension 18, or pole pieces 20 are attached to stator extension 18 with an adhesive such as epoxy, for example. The technique of coordinating of the height of protrusions 36 with the depth of slots 34, fastening pole pieces 20 to end plate 30, or combinations thereof is useful for providing precise control of air gap 52 (FIG. 2) between the stator and the rotor of machine 10.

In another embodiment, machine 10 further comprises a circuit board 28 situated adjacent to the stator extension and electrically coupled to the electrical coils.

Figure 8:
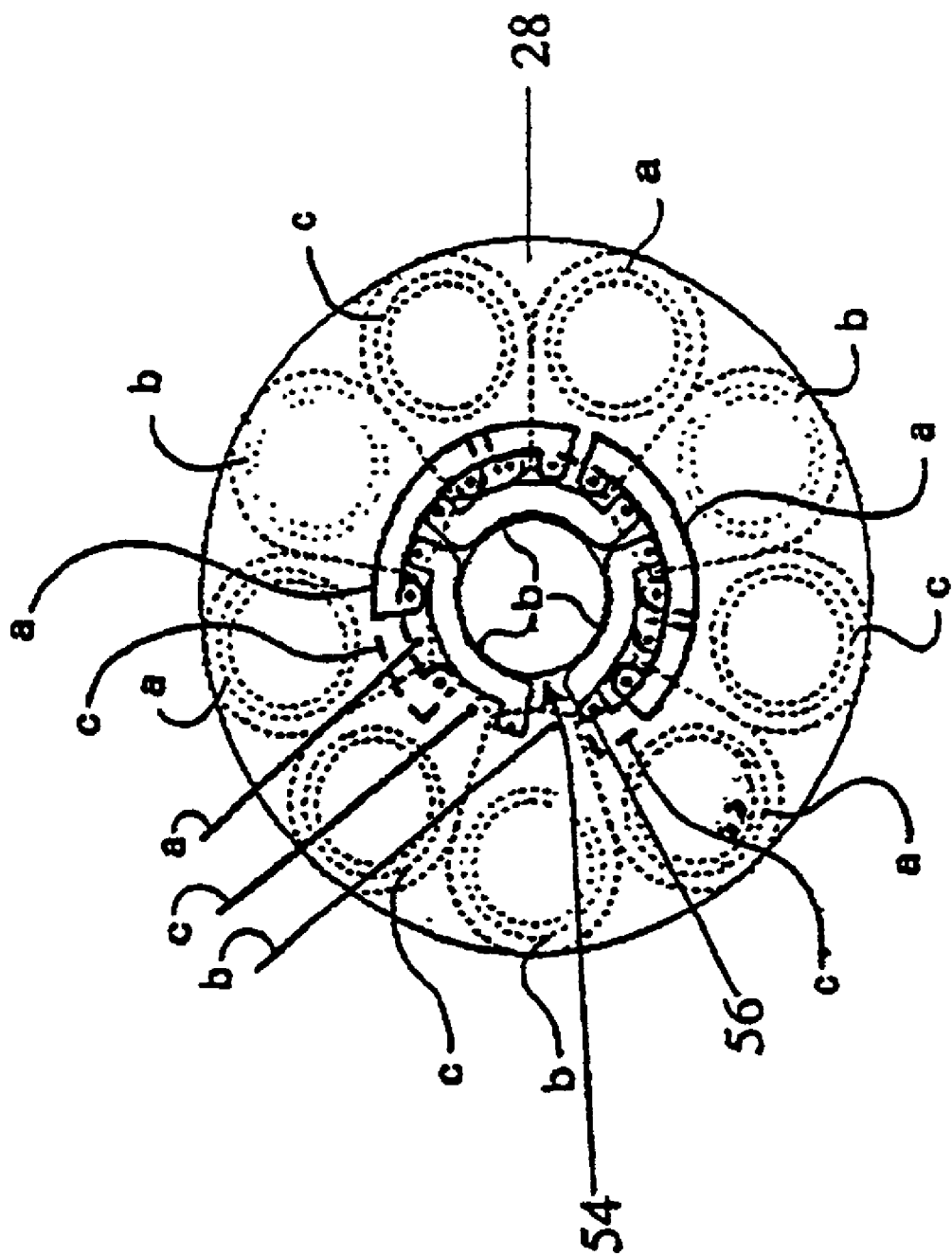
FIG. 8 is a top view of a circuit board in accordance with another embodiment of the present invention.

Electrical coupling is typically achieved via solder or by a pin-socket connection (not shown) for example. In one more specific embodiment, the electrical coils are interconnected with a supply voltage (not shown) in the proper sequence by a circuit pattern 54 printed on the circuit board. In the example of FIG. 8, phases a and b are patterned on the top of circuit board 28, and phase c is patterned on the bottom of circuit board 28. Electrical coils 24 (FIG. 2) can be coupled to circuit pattern 54 at sockets 56, for example, and thus eliminate any need for making crimp connections between coils and the supply voltage.

In another more specific embodiment, machine 10 further comprises bobbins 26, each mechanically coupled to circuit board 28, partially surrounding a respective one of pole pieces 20, and having a respective one of the electrical coils 24 wound thereon. Bobbins 26 comprise a ground insulation material and are typically wound with electrical coils 24 prior to machine assembly.

In a fabrication embodiment, soft magnetic composite pole pieces 20 are attached to soft magnetic composite stator extension 18 by situating protrusions 36 of pole pieces 20 within respective slots 34 of stator extension 18. Each protrusion is shaped so as to facilitate orientation of the respective pole piece with respect to the stator extension. In a more specific embodiment, prior to attachment of pole pieces 20, a circuit board assembly 50 is situated adjacent to the stator extension. In this embodiment, the circuit board assembly comprises circuit board 28, bobbins 26 mechanically coupled to circuit board 28, and electrical coils 24, each wrapped around a respective one of bobbins 26 and coupled to circuit board 28, and attaching comprises inserting pole pieces 20 through bobbins 26 to stator extension 18. In embodiments wherein an end plate 30 and fasteners 32 are used, the fasteners can be secured in a manner to further control the air gap of machine 10. Also shown in FIG. 1 is a bearing support 24 which is useful for attaching rotor disk 14 to rotatable shaft 12.

In conventional radial machines, the pole-to-pole gap between adjacent pole pieces is designed to be large enough to accommodate the insertion of electrical coils. By using the above described fabrication techniques, the pole-to-pole gap 40 between adjacent pole pieces is not constrained by electrical coil insertion factors and can be sized so as to maximize flux transmitted to air gap 52 by the winding MMF (magnetorotive force) and simultaneously to maximize the magnet MMF that links the electrical coils. Optimizing the pole to pole gap maximizes the torque constant of the machine.

Figure 9:
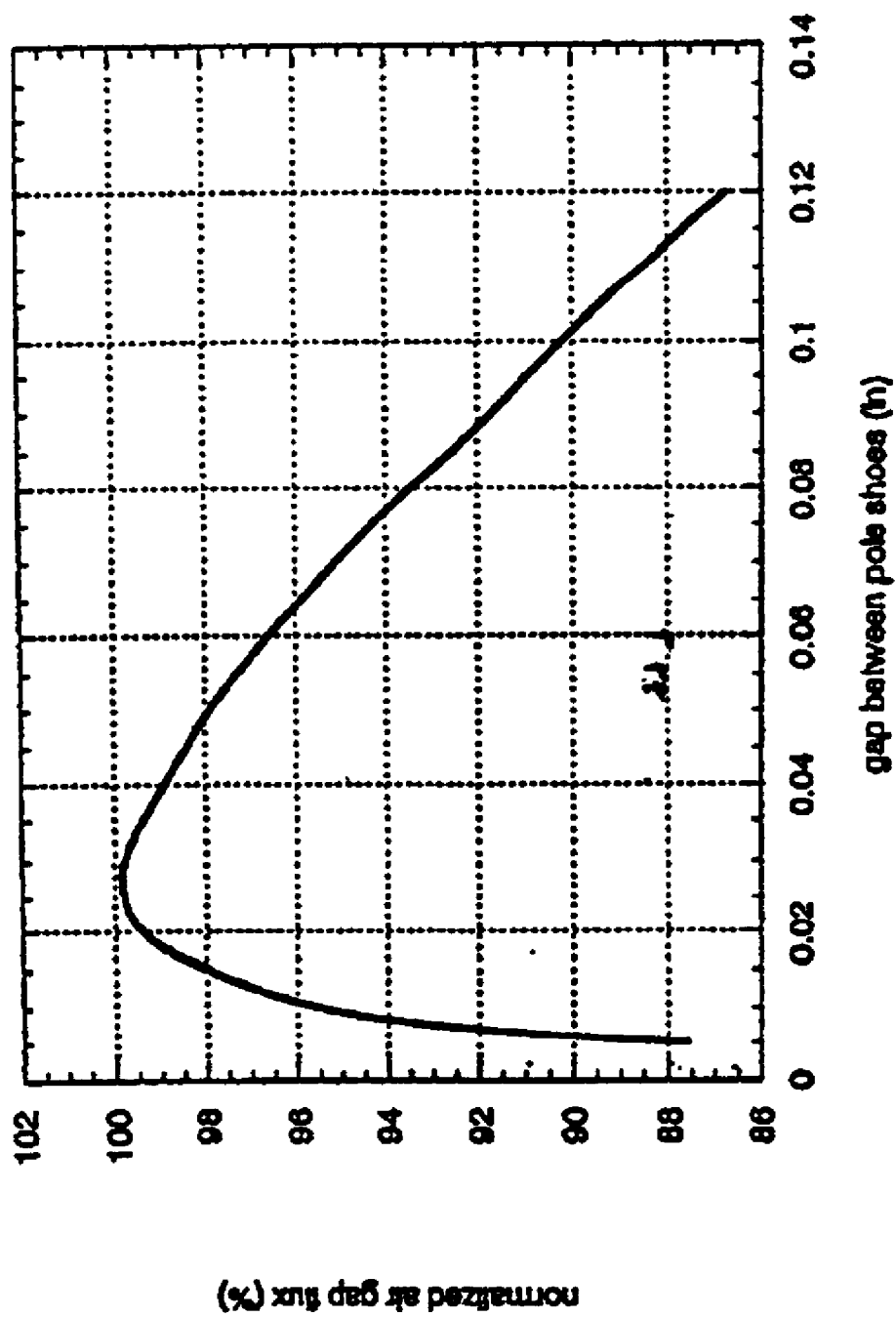
FIGS. 9 and 10 are graphs of normalized air gap flux (FIG. 9) and coil linkage flux (FIG. 10) produced by winding MMF as a function of pole-to-pole gap in accordance with one embodiment of the present invention.
Figure 10:
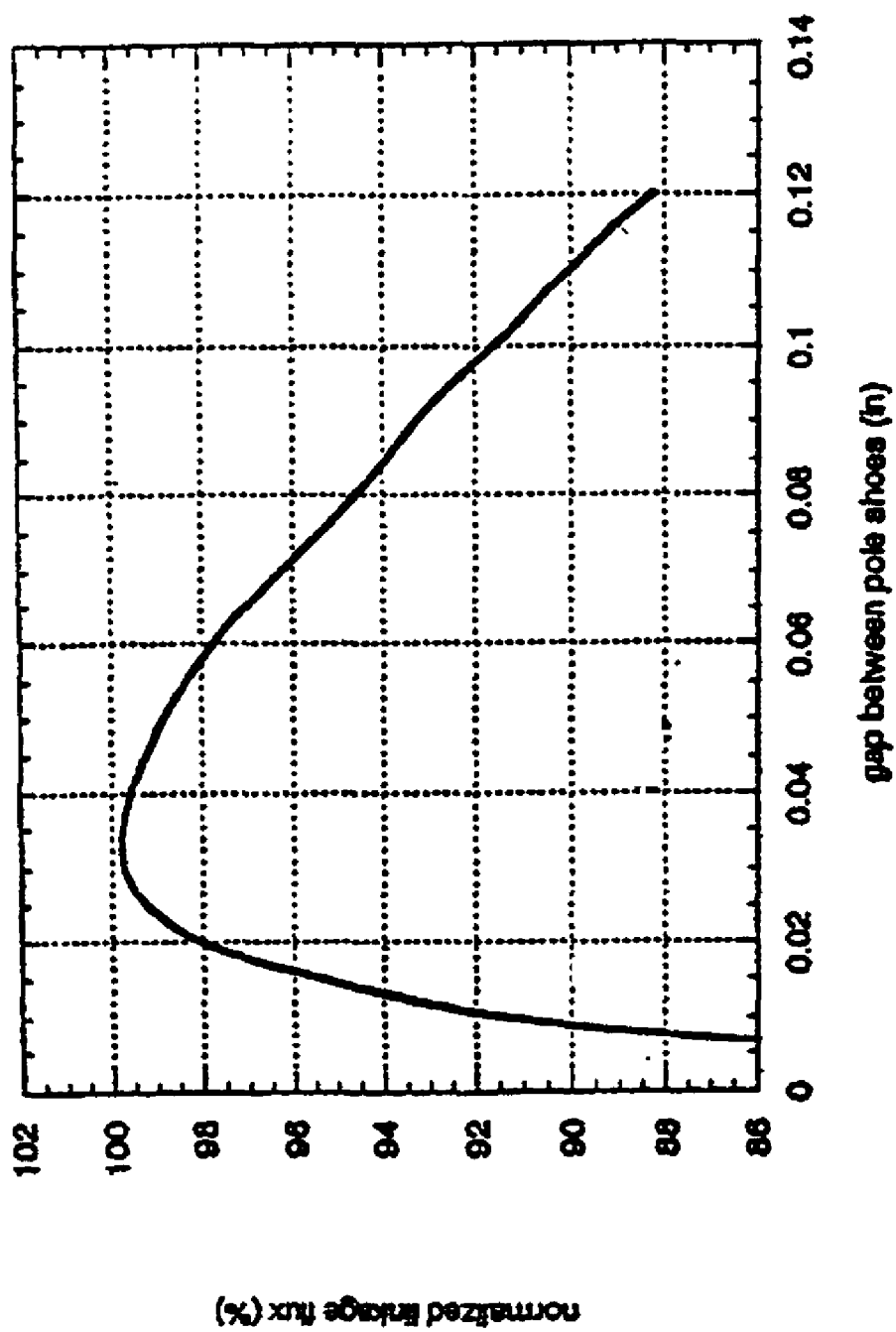

FIGS. 9 and 10 are graphs of normalized air gap flux (FIG. 9) and coil linkage flux (FIG. 10) produced by winding MMF as a function of pole-to-pole gap 40 in accordance with one embodiment of the present invention wherein each pole piece 20 comprises a base portion 42 around which a respective electrical coil 24 is wrapped and a trapezoidal shield portion 44 extending over at least part of the respective electrical coil, and wherein the dimensions of FIGS. 3–7 are used. The trapezoidal portion may comprise edges having straight lines or edges having straight and curved lines as shown in FIGS. 1 and 3. The optimal pole to pole spacing depends on the equivalent magnetic circuit of the machine. The magnetic circuit of the machine is determined by a number of factors including the dimensions of the pole piece 20 and stator extension 18, parameters such as permanent magnet 16 material, and soft magnetic material in the stator and rotor.

As can be seen in FIG. 9, if pole-to-pole gap 40 is too long, there is less area associated with the air gap flux, and the air gap path reluctance is increased. If pole-to-pole gap 40 is too short, the reluctance of the pole-to-pole flux path is small, and more flux is lost to this path. As can be seen in FIG. 10, pole-to-pole gap 40 also affects the flux produced by the magnet that links the coils. Having magnet flux transverse from one pole piece edge to another without linking the electrical coils is not desirable from the point of view of the shape of the back EMF waveform and from a cogging torque perspective.

In one trapezoidal shaped shield portion embodiment of the present invention which was designed for an embodiment including dimensions shown in FIGS. 3–7, pole-to-pole gap 40 ranges from about 0.5 millimeters to about 1.25 millimeters. In a more specific trapezoidal shaped shield portion embodiment, pole-to-pole gap 40 ranges from about 0.5 millimeters to about 1 millimeter. In a still more specific trapezoidal shaped shield portion embodiment, pole-to-pole gap 40 is about 0.75 millimeters. For ease of winding, base portion 42 is typically a cylindrical shape. However, any desired shape may be used.

In another embodiment of the present invention which can be used in combination with or separately from the protrusion-slot embodiment of the present invention, the pole pieces are optimally shaped to minimize leakage flux between adjacent pole pieces while maximizing the distribution of air gap flux. Shaped as used herein encompasses the geometrical nature of the pole pieces as well as the size (which in turn affects the pole-to-pole gap). In a more specific embodiment, each soft magnetic composite pole piece 20 comprises a base portion 42 around which a respective electrical coil 24 is wrapped and a trapezoidal shield portion 44 extending over at least part of the respective electrical coil, the trapezoidal shield portion having a plurality of heights (meaning at least two) with a first height in a first region 46 being longer than a second height in a second region 48, the second region being closer to a pole-to-pole gap 40 than the first region.

The first and second heights are typically selected in a manner to maximize the MMF produced by the electrical coils that reaches the air gap and maximize the magnet MMF that links the electrical coils. Increasing the height of the trapezoidal shield portions increases the area for the flux to transverse from pole piece to pole piece and decreases the reluctance of this path. In this regard, the smaller the height of the trapezoidal shield portion, the better. The trapezoidal shield portion is designed to be thick enough however, to be moldable and to conduct the magnet flux from the air gap to the cylindrical pole with out significant reluctance or saturation. Having a first height in a first region be longer than a second-height in a second region, the second region being closer to pole-to-pole gap 40 than the first region, is useful for addressing these goals. Although two heights are shown for purposes of example, alternative embodiments include additional discrete heights, curved surfaces, or a combination thereof.

In one embodiment wherein the protrusion and pole piece shaping embodiments are combined, for example, an axial flux machine stator pole piece 20 comprises: a soft magnetic composite base portion 42; a soft magnetic composite trapezoidal shield portion 44 coupled to a first end 60 of the base portion, the trapezoidal shield portion comprising a plurality of heights with a first height in a first region 46 being longer than a second height in a second region 48, the second region being further from the base portion than the first region, and a protrusion 36 coupled to a second end 62 of the base portion and shaped so as to facilitate orientation of the respective pole piece. In a more specific embodiment, protrusion 36 extends from a ledge 38 of pole piece 20 which is substantially parallel to trapezoidal shield portion 44.

While only certain features of the invention have been illustrated and described herein, many modifications and changes will occur to those skilled in the art. It is, therefore, to be understood that the appended claims are intended to cover all such modification and changes as fall within the true spirit of the invention.

What is claimed is:

1. An axial flux machine comprising:
   a rotatable shaft;
   a rotor disk coupled to the rotatable shaft;
   a permanent magnet supported by the rotor disk;
   a soft magnetic composite stator extension positioned in parallel with the rotor disk and having slots;
   soft magnetic composite pole pieces attached to the stator extension and facing the permanent magnet, each comprising a protrusion situated within a respective one of the slots, each protrusion shaped so as to facilitate orientation of the respective pole piece with respect to the stator extension;
   electrical coils, each wrapped around a respective one of the pole pieces.

2. The machine of claim 1 wherein the slots comprise quasi-rectangular slots and the protrusions comprise quasi-rectangular protrusions.

3. The machine of claim 1 wherein the protrusions extend from ledges of the pole pieces which are substantially parallel to the stator extension.

4. The machine of claim 1 further comprising a circuit board situated adjacent to the stator or extension and electrically coupled to the electrical coils.

5. The machine of claim 4 wherein the circuit board comprises a circuit pattern configured for proper sequencing of the electrical coils.

6. The machine of claim 1 wherein each pole piece comprises a base portion around which a respective electrical coil is wrapped and a trapezoidal shield portion extending over at least part of the respective electrical coil.

7. The machine of claim 6 wherein the pole pieces are optimally shaped to minimize leakage flux between adjacent pole pieces while maximizing magnetomotive force linking the electrical coils.

8. The machine of claim 6 wherein the trapezoidal shield portion has a plurality of heights with a first height in a first region being longer than a second height in a second region, the second region being closer to a pole-to-pole gap than the first region.

9. An axial flux machine stator comprising:
   a soft magnetic composite stator extension having slots;
   soft magnetic composite pole pieces attached to the stator extension, each comprising a protrusion situated within a respective one of the slots, each protrusion shaped so as to facilitate orientation of the respective pole piece with respect to the stator extension;
   electrical coils each wrapped around a respective one of the pole pieces.

10. The stator of claim 9 wherein the slots comprise quasi-rectangular slots and the protrusions comprise quasi-rectangular protrusions.

11. The stator of claim 9 wherein the protrusions extend from ledges of the pole pieces which are substantially parallel to the stator extension.

12. The stator of claim 9 further comprising a circuit board situated adjacent to the stator extension and electrically coupled to the electrical coils.

13. The stator of claim 12 wherein the circuit board comprises a circuit pattern configured for proper sequencing of the electrical coils.

14. The stator of claim 9 wherein each pole piece comprises a base portion around which a respective electrical coil is wrapped and a trapezoidal shield portion extending over at least part of the respective electrical coil.

15. The stator of claim 14 wherein the trapezoidal shield portion has a plurality of heights with a first height in a first region being longer than a second height in a second region the second region being closer to a pole-to-pole gap than the first region.

16. An axial flux machine comprising:

a rotatable shaft;

a rotor disk coupled to the rotatable shaft;

a permanent magnet supported by the rotor disk;

a soft magnetic composite stator extension positioned in parallel with the rotor disk;

soft magnetic composite pole pieces attached to the stator extension and facing the permanent magnet, each comprising a base portion and a trapezoidal shield portion the trapezoidal shield portion having a plurality of heights with a first height in a first region being longer than a second height in a second region the second region being closer to a pole-to-pole gap than the first region;

electrical coils each respective electrical coil wrapped around a respective base portion of a respective pole piece with a respective trapezoidal shield portion extending over at least part of the respective electrical coil.

17. The machine of claim 16 wherein the pole pieces are optimally shaped to minimize leakage flux between adjacent pole pieces while maximizing magnetomotive force linking the electrical coils.

18. The machine of claim 16 wherein the stator extension has slots and wherein each pole piece comprises a protrusion situated within a respective one of the slots, each protrusion shaped so as to facilitate orientation of the respective pole piece with respect to the stator extension.

19. The machine of claim 18 wherein the protrusions extend from ledges of the pole pieces which are substantially parallel to the stator extension.

20. The machine of claim 16 further comprising a circuit board situated adjacent to the stator extension and electrically coupled to the electrical coils.

21. The machine of claim 20 wherein the circuit board comprises a circuit pattern configured for proper sequencing of the electrical coils.

22. An axial flux machine stator comprising:

a soft magnetic composite stator extension;

soft magnetic composite pole pieces attached to the stator extension, each comprising a base portion and a trapezoidal shield portion the trapezoidal shield portion having a plurality of heights with a first height in a first region being longer than a second height in a second region the second region being closer to a pole-to-pole gap than the first region;

electrical coils each respective electrical coil wrapped around a respective base portion of a respective pole piece with a respective trapezoidal shield portion extending parallel to the stator extension over at least part of the respective electrical coil.

23. The stator of claim 22 wherein the stator extension has slots and wherein each pole piece comprises a protrusion situated within a respective one of the slots.

24. The stator of claim 23 wherein the protrusions extend from ledges of the pole pieces which are substantially parallel to the stator extension.

25. The stator of claim 22 further comprising a circuit board situated adjacent to the stator extension and electrically coupled to the electrical coils.

26. An axial flux machine stator pole piece comprising:

a soft magnetic composite base portion; the base magnetic composite trapezoidal shield portion coupled to a first end of the base portion, the trapezoidal shield portion comprising a plurality of heights with a first height in a first region being longer than a second height in a second region, the second region being further from the base portion than the first region; and a protrusion coupled to a second end of the base portion and shaped so as to facilitate orientation of the respective pole piece.

27. The pole piece of claim 26 wherein the protrusion extends from a ledge of the pole piece which is substantially parallel to the trapezoidal shield portion.

* * * * *